Sept. 2, 1952  C. A. CRAWFORD ET AL  2,609,478
ELECTRICALLY-HEATED APPLIANCE AND STAND THEREFOR
Filed Aug. 18, 1947  2 SHEETS—SHEET 1
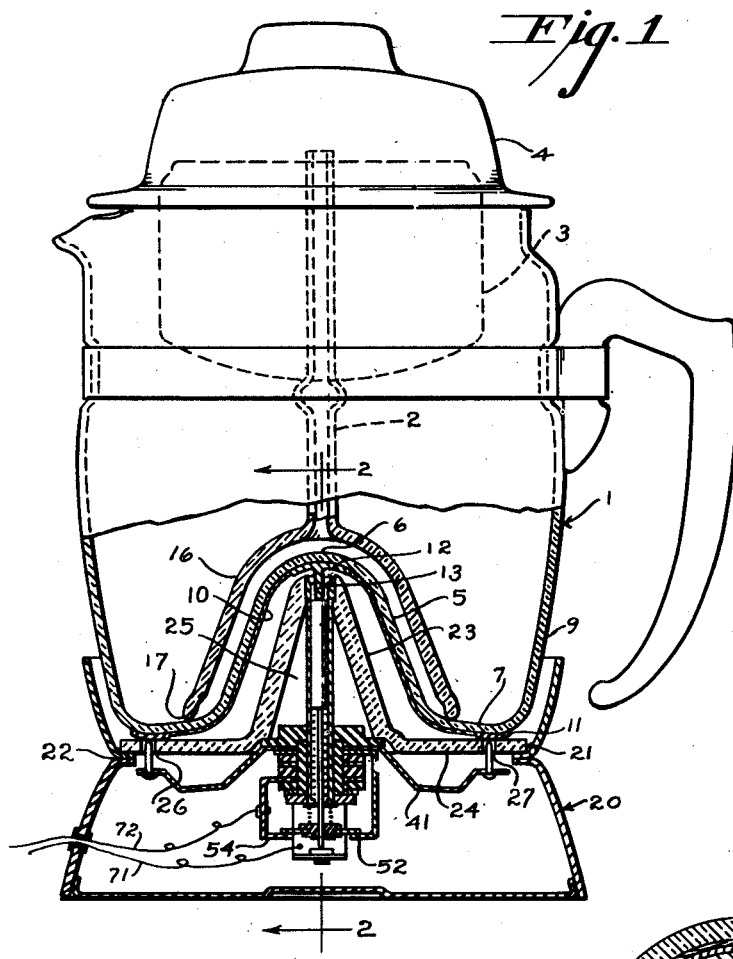
Fig. 1
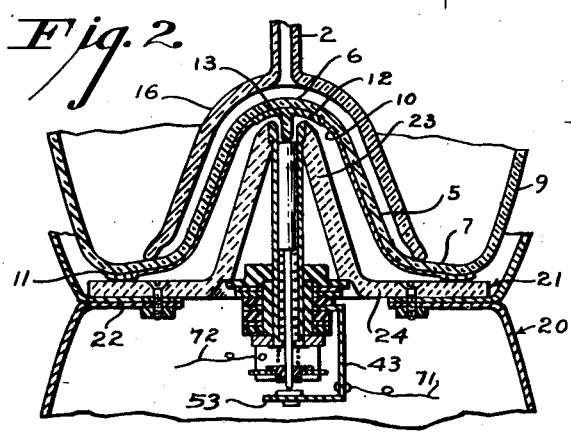
Fig. 2
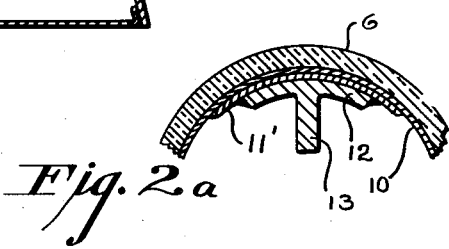
Fig. 2a
Inventors
CLARK A. CRAWFORD
AND ANTHONY MILLER
By F. H. Knight
Attorney Sept. 2, 1952     C. A. CRAWFORD ET AL     2,609,478
ELECTRICALLY-HEATED APPLIANCE AND STAND THEREFOR
Filed Aug. 18, 1947     2 SHEETS—SHEET 2
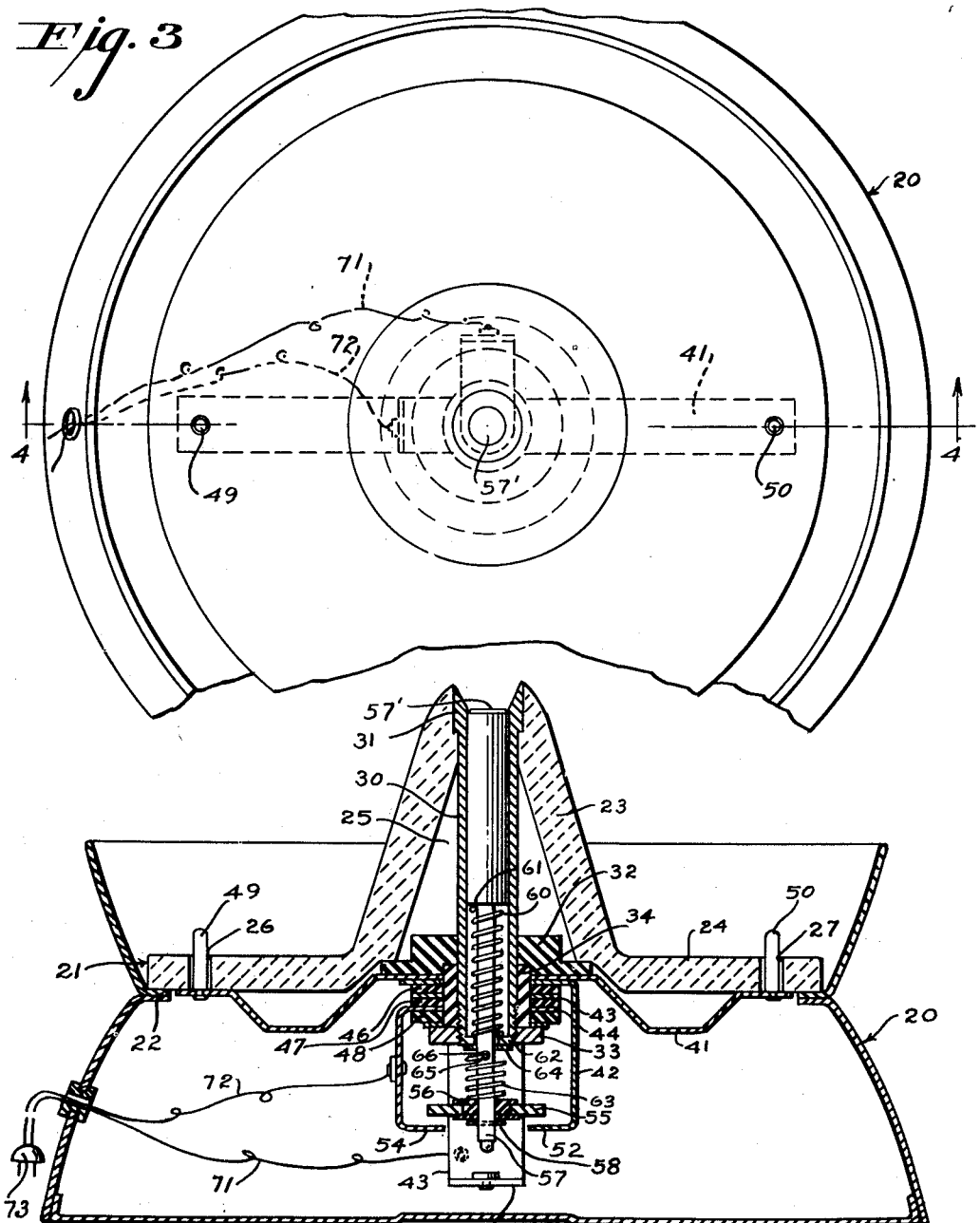
Inventors
CLARK A. CRAWFORD
AND ANTHONY MILLER
By
F. H. Knight
Attorney Patented Sept. 2, 1952

2,609,478

UNITED STATES PATENT OFFICE 2,609,478

ELECTRICALLY HEATED APPLIANCE AND STAND THEREFOR

Clark A. Crawford, Corning, and Anthony Miller, Elmira, N. Y., assignors to Corning Glass Works, Corning, N. Y., a corporation of New York Application August 18, 1947, Serial No. 769,102

8 Claims. (Cl. 219—43)

1

The present invention relates to an electrically-heated appliance having its heating element integral therewith and an associated, circuit controlling support therefor.

In general, the prime object of the invention is a device of the foregoing character which will efficiently perform the purposes for which it is intended, which is simple and economical of construction, and which can be expeditiously, conveniently, and safely manipulated.

Another object is an electrically-heated appliance and a cooperating support therefor, which supplies operating current to the appliance when the same is arranged on the support.

A further object is an appliance support of the foregoing type which affords maximum protection to the user against electrical shock.

Another object is a cordless electrical cooking utensil which can be washed without danger of detrimental effect to the heating element.

A still further object is an electric percolator capable of brewing coffee at an extremely rapid rate.

Further objects and features of the invention will become apparent from a further perusal of this specification when considered in connection with the accompanying drawings forming a part thereof.

In the accompanying drawings Fig. 1 is a side elevation, partly in section, illustrating a coffee percolator and a support therefor embodying the invention.

Fig. 2 is a fragmentary view of Fig. 1 taken on line 2—2.

Fig. 2a is an enlarged view, in section, of a fragment of the percolator.

Fig. 3 is a top plan view of the greater part of the base of the assembly.

Fig. 4 is a sectional elevation taken on line 4—4 of Fig. 3.

In brief, the invention as illustrated comprises a glass percolator having a vessel 1, pump 2, basket 3, and cover 4, and a support or stand 20. The vessel differs from conventional forms in that it has a raised, conical-shaped bottom, the wall 5 having a dome-shaped top 6. The base of the conical bottom wall portion 5 is joined to a surrounding substantially horizontally disposed bottom portion 7 whose periphery is in turn joined to the surrounding side wall 9.

The underside of portions 5—7 is provided with an electrically conductive coating 10 integrally attached to the glass. In order to prevent the watt density or heat input per unit of area from increasing excessively as the center of the area

2 is approached, the conductive coating is so distributed that its electrical resistance per unit of area increases as the distance from center increases. This is accomplished by properly grading the coating thickness. Putting it another way, the coating is so distributed that its thickness, and hence its conductivity, increases as the distance from the periphery of the coated area increases.

The peripheral portion of coating 10 is provided with a terminal 11 comprising a low-resistance metallized coating in the form of a flat circular band. Centrally disposed on the coating 10 is a similar low-resistance coating 11' to which is attached, by soldering for example, a terminal 12 having a depending prod or post 13.

A suitably abrasion-resistant electrically conductive coating may be produced by spraying the vessel, while heated, with tin chloride or other tin salt. The low-resistance terminals may be formed by applying a silver metallizing composition and firing it on the glass in known manner.

The pump 2 has a support portion 16 of the general configuration of the vessel parts 5 and 6, and is of such size that when resting on the vessel bottom there is approximately one-eighth inch space between the opposing surfaces of the vessel and pump support portions. The bottom edge portion 17 of the pump is not provided with serrations, the perfectly plain usual manufacturing irregularities in portion 17 and the adjoining bottom surface of portion 7 of the vessel providing ample space for the passage of fluid from the vessel 1 into the space between support portion 16 and vessel portions 5 and 6.

The vessel support 20 contains an element 21 of electrical insulation, carried on a circular base portion 22, and comprising a central upstanding or conical portion 23 and a surrounding flat portion 24. Portion 23 has an aperture or passage 25 (Fig. 4) therethrough, and portion 24 has apertures or passages 26 and 27 therethrough. A sleeve 30 passing through aperture 25 is securely clamped between the enlarged end 31 of sleeve 30 and a clamping washer 32. Arranged on sleeve 30 between washer 32 and a clamping nut 33 is an insulating sleeve 34 about which are arranged a series of flat springs 41—44. Springs 41 and 42 directly engage one another, whereas springs 42—44 are insulated from one another by suitable spacer washers 46—48. Spring 41 at its opposite end carries electrodes 49 and 50 which project up through apertures 26 and 27 respectively. Springs 42 and 44 are bent to bring their free ends 52 and 54 in position to be electrically connected to one another by a metal washer 55 supported on an insulator 56 carried on a plunger electrode 57, and spring 43 is bent to bring its free end 53 directly under electrode 57.

The plunger electrode 57 within the sleeve 30 is surrounded by a spring 60 compressed between an enlarged portion 61 of the electrode and an inturned flange 62 of the sleeve, and accordingly spring 60 tends to move electrode 57 up. This movement is restricted by a stop washer 64 prevented from moving down on the electrode by the end 65 of a spring 63 which passes through an aperture 66 in electrode 57. Spring 63 is threaded on electrode 57 and is held in a compressed state between flange 62 and insulator 56 by a pin 58 passing through the electrode, and serves to enable downward movement of the plunger into contact with spring end 53 after washer 55 engages the relatively rigid contact spring ends 52 and 54.

Incoming conductors 71 and 72 are at one end connected to springs 43 and 44, and at their other end terminate in a conventional attachment plug 73 for connection with any available current source.

As will be clear from an inspection of Fig. 4, when the support 20 is unoccupied, no electrical connection exists between springs 44 and 42, or between spring 43 and electrode 57, and accordingly exposure of electrodes 49, 50 and the shielded end 57' of electrode 57 presents no shock hazard. Furthermore, because of the shielded position of the top or exposed end 57' of electrode 57, danger of inadvertent depression thereof far enough to connect a potential to the electrodes 49, 50 and 57 is prevented. When, however, the vessel is placed on the support 20, prod 13 engages and lowers electrode 57 into engagement with spring end 53 and hence into electrical connection with conductor 71. As electrode 57 is being lowered, the metal washer 55 bridges spring ends 52 and 54 to electrically connect conductor 72 with spring 42 and accordingly with spring 41, and electrodes 49 and 50.

The springs 41 and 60 are so tensioned that a compressive force equal to the weight of the vessel, pump, basket and cover, plus fluid to a level at least to the top of the dome, is required to compress them to their operative positions as shown in Figs. 1 and 2, so that if the liquid boils away below this level, the vessel will be automatically raised and electrical connections to its heating element interrupted.

Although the invention has been shown applied to a coffee maker of a particular type, it will be appreciated that various features thereof may be incorporated in other forms of electrically-heated devices and stands therefor without departing from the spirit and scope of the invention as claimed.

The electrically heated device described above is claimed in an application entitled "Electrically-Heated Appliance" and filed August 1, 1952, by Clark A. Crawford as a division of the instant application.

What is claimed is:

1. In combination, a support, an electrically heatable device adapted to become energized when placed on said support and to become de-energized when removed therefrom, said device having a circular electrical heating element arranged transverse the bottom thereof, terminals for said element one centrally disposed with respect to said element and the other surrounding and uniformly spaced from said first terminal, cooperating current supply electrodes carried by the support adapted for detachable engagement by said terminals, said electrodes being in the form of plungers adapted to be actuated consequent to placement of said device on said support irrespective of the angular position of the device with respect to said support, and means actuated by one of said electrodes during placement of the device on the support to connect a current source to said electrodes.

2. A combination comprising a support including a plurality of electrodes electrically connected to one another and each comprising a spring-supported plunger, two vertically disposed, coextensively arranged elements centrally disposed with respect to said electrodes and at least one of which is spring supported, an appliance to be loaded with a material to be heated having an electric heating element with bottom terminals adapted to register with said plungers and elements when arranged thereon and of a weight when loaded to depress said plungers and the spring-supported element, and means actuated under the influence of said latter element to connect one of said elements and said plungers to the terminals of a current source whereby the appliance becomes energized.

3. In combination, a support, an electrically heatable device adapted to become energized when placed on said support and to become de-energized when removed therefrom, said device having a circular electric heating element arranged transverse the bottom thereof, terminals for said element one centrally disposed with respect to said element and the others surrounding and uniformly spaced from said first terminal cooperating current supply electrodes carried by the support adapted for detachable engagement by said terminals, contacts for connecting said electrodes to a source of current, and means including a device associated with the centrally disposed terminal and with the cooperating support electrode respectively for actuating said contacts consequent to the placement of the device on the support irrespective of the radial position of said device with respect to said support.

4. A combination comprising a support assembly including a plurality of electrodes electrically connected to one another and each comprising a spring-supported plunger, an additional electrode for said assembly comprising a spring-supported plunger centrally disposed with respect to said first plungers, a sleeve surrounding and extending a substantial height above said additional electrode, an electrically-heated device adapted to be supported on said plungers and of a weight to depress them when resting thereon, a terminal for said device in the form of an endless band in like manner engaged by said first plungers, another terminal for said device having an associated depending rod adapted to enter said sleeve and depress said additional electrode plunger, and means mechanically linked to said latter plunger for establishing and breaking connections between said electrodes and the terminals of a current source.

5. An electric heating device having a bottom raised in the center and having secured to its under surface an electric heating element, a terminal for said element occupying the bottom surface area surrounding the raised portion and having a substantially flat under surface, and a second terminal for said element occupying the central region of said bottom and including a vertically disposed depending rod terminating at a level above the area occupied by said first terminal, a support for said device having a plurality of resiliently mounted electrodes engaged by the first defined terminal and depressed by the device when arranged on said support, a similar electrode engaged and depressed by said rod as the device becomes arranged on said support, and circuit switching means under control of said latter electrode.

6. In a support for an electrically-heated appliance adapted to be energized consequent to placement on said support, a base for the support, an element of electrical insulation carried by said base and comprising a central upstanding portion and a surrounding flat portion, said element having vertically disposed passages through the center of said upstanding portion and through the flat portion respectively, a plunger occupying the aperture through the upstanding portion, a spring tending to move said plunger upward, means limiting upward movement of said plunger to a position in which its top remains below the top of the aperture it occupies, a current source terminal engageable by said plunger when the same is moved to an alternative position against the tension of said spring, a second plunger occupying an aperture through said flat portion, a current source terminal for connection with said second plunger, and means associated with said first plunger for effecting an electrical connection between said latter terminal and said second plunger.

7. In a support for an electrically-heated appliance, a circular body of electrical insulating material comprising a flat portion surrounding a conical portion and having apertures in the flat portion spaced about the peripheral portion thereof and equally spaced from the center and having another aperture through the center of the conical portion, resiliently mounted electrodes occupying said first apertures and projecting above the top of the flat portion, a resiliently mounted electrode occupying the aperture through the cone portion and terminating below the top thereof, and means arranged under said circular body and operatively associated with the latter one of said electrodes for connecting the terminals of a current source to said electrodes.

8. An electrically energizable appliance support having vertical apertures therethrough, resiliently mounted appliance energizing current supply electrodes occupying said apertures and available for depression by an appliance arranged on said support, appliance energizing current supply terminals associated with said support, a circuit having two normally open branches each leading from one of said terminals to its electrode, each branch including a pair of electrically separated contacts, and means directly operated by one of said electrodes when depressed to electrically connect the respective contacts of each pair with one another.

CLARK A. CRAWFORD.
ANTHONY MILLER.

REFERENCES CITED

The following references are of record in the file of this patent:

UNITED STATES PATENTS

| Number | Name | Date |
|---|---|---|
| 799,377 | Harden | Sept. 12, 1905 |
| 2,020,364 | Lehmann | Nov. 12, 1935 |
| 2,021,661 | Kisfaludy | Nov. 19, 1935 |
| 2,054,714 | Reich | Sept. 15, 1936 |
| 2,119,680 | Long | June 7, 1938 |
| 2,266,090 | Smith | Dec. 16, 1941 |
| 2,378,772 | Hummel | June 19, 1945 |
| 2,431,998 | Ely | Dec. 2, 1947 |
| 2,434,560 | Gunter | Jan. 13, 1948 |